United States Patent
Wang et al.

(10) Patent No.: US 11,170,482 B2
(45) Date of Patent: Nov. 9, 2021

(54) IMAGE PROCESSING METHOD AND DEVICE

(71) Applicant: BOE TECHNOLOGY GROUP CO., LTD., Beijing (CN)

(72) Inventors: Lvwei Wang, Beijing (CN); Zhenglong Li, Beijing (CN); Yingying Li, Beijing (CN)

(73) Assignee: BOE TECHNOLOGY GROUP CO., LTD.

( * ) Notice: Subject to any disclaimer, the term of this patent is extended or adjusted under 35 U.S.C. 154(b) by 9 days.

(21) Appl. No.: 16/619,771

(22) PCT Filed: Aug. 20, 2018

(86) PCT No.: PCT/CN2018/101242
§ 371 (c)(1),
(2) Date: Dec. 5, 2019

(87) PCT Pub. No.: WO2019/037676
PCT Pub. Date: Feb. 28, 2019

(65) Prior Publication Data
US 2020/0143526 A1    May 7, 2020

(30) Foreign Application Priority Data
Aug. 23, 2017 (CN) .......................... 201710730705.2

(51) Int. Cl.
*G06T 5/50* (2006.01)
*G06T 7/13* (2017.01)
(Continued)

(52) U.S. Cl.
CPC ................ *G06T 5/50* (2013.01); *G06T 5/009* (2013.01); *G06T 7/0012* (2013.01); *G06T 7/13* (2017.01);
(Continued)

(58) Field of Classification Search
CPC .. G06T 5/50; G06T 7/13; G06T 5/009; G06T 7/0012; G06T 2207/20081;
(Continued)

(56) References Cited

U.S. PATENT DOCUMENTS 9,684,967 B2 * 6/2017 Abedini ................ G06K 9/6256
2017/0017841 A1 1/2017 Chen et al.
(Continued)

FOREIGN PATENT DOCUMENTS

CN 104217437 A 12/2014
CN 104992430 A 10/2015
(Continued)

OTHER PUBLICATIONS

Farooq et al. "Automatic Lesion Detection System (ALDS) for Skin Cancer Classification Using SVM and Neural Classifiers." IEEE 16th International Conference on Bioinformatics and Bioengineering, Oct. 31, 2016, pp. 301-308 (Year: 2016).*
(Continued)

*Primary Examiner* — Jon Chang
(74) *Attorney, Agent, or Firm* — The Webb Law Firm (57) ABSTRACT

The present disclosure relates to an image processing method and a device, wherein the image processing method includes: acquiring a first image, the first image including an image formed with respect to a skin part of a patient to be diagnosed which needs diagnosis; inputting the first image into a neural network, to acquire position information of a pathologic change area in the first image; acquiring a boundary of the pathologic change area in the first image, acquiring an original image and a mask image which include the pathologic change area from the first image; fusing the mask image and the original image, obtaining a target image corresponding to the pathologic change area; wherein the target image is an image for diagnosing the pathologic
(Continued)

change area, pixel points in the target image correspond to those in the original image and the mask image one by one.

19 Claims, 5 Drawing Sheets

(51) Int. Cl.
  *G06T 5/00* (2006.01)
  *G06T 7/00* (2017.01)
(52) U.S. Cl.
  CPC ............... *G06T 2207/20081* (2013.01); *G06T 2207/20084* (2013.01); *G06T 2207/20221* (2013.01); *G06T 2207/30088* (2013.01)
(58) Field of Classification Search
  CPC . G06T 2207/20221; G06T 2207/30088; G06T 2207/10056; G06T 2207/20084
  See application file for complete search history.

(56) References Cited

U.S. PATENT DOCUMENTS

2018/0103892 A1* 4/2018 Kaur ..................... G06T 7/136
2018/0279943 A1* 10/2018 Budman ............... G06T 7/0014

FOREIGN PATENT DOCUMENTS

| CN | 105894470 A | 8/2016 |
| CN | 106056596 A | 10/2016 |
| CN | 106203432 A | 12/2016 |
| CN | 106447721 A | 2/2017 |
| CN | 106611402 A | 5/2017 |
| CN | 107464230 A | 12/2017 |

OTHER PUBLICATIONS

First Office Action for CN Appl. No. 201710730705.2, dated Jul. 8, 2019.
Guo, Q., et al., "Adaptive Segmentation of Liver MR Images", College of Mathematics and Computer Science, Fuzhou University, Fuzhou, Fujian 350108, China, Meteorological Information Center of Fujian Province, Fuzhou, Fujian 350001, China, Fujian Key Laboratory of Medical Instrumentation and Pharmaceutical Technology, Fuzhou University, Fuzhou, Fujian 350002, China.
International Search Report and Written Opinion for PCT App. No. PCT/CN2018/101242 dated Nov. 14, 2018.
Second Office Action for CN Appl. No. 201710730705.2, dated Dec. 25, 2019.

* cited by examiner

IMAGE PROCESSING METHOD AND DEVICE

CROSS-REFERENCE TO RELATED APPLICATIONS

The present application is a U.S. National Stage under 35 U.S.C. § 371 of International Application No. PCT/CN2018/101242, as filed on Aug. 20, 2018, which claims priority to China Patent Application No. 201710730705.2, filed on Aug. 23, 2017, entitled "Image Processing Method and Device". The disclosure of each of these applications is incorporated by reference herein in its entirety.

TECHNICAL FIELD

The present disclosure relates to an image processing method and an image processing device.

BACKGROUND

With respect to a dermatosis patient, the following operations are mainly performed: a suspicious sick area and a surrounding area of the patient to be diagnosed are photographed, then a practical doctor manually positions the suspicious sick area in the photographed image, and finally, based on a result of the manual positioning, the suspicious sick area is diagnosed.

SUMMARY

According to some embodiments of the present disclosure, there is provided an image processing method comprising: acquiring a first image, the first image including an image formed with respect to a skin part of a patient to be diagnosed which needs diagnosis; inputting the first image into a neural network, to acquire position information of a pathologic change area in the first image; acquiring a boundary of the pathologic change area in the first image, acquiring an original image and a mask image which include the pathologic change area from the first image; and fusing the mask image and the original image to obtain a target image corresponding to the pathologic change area; wherein the target image is an image for diagnosing the pathologic change area, pixel points in the target image correspond to pixel points in the original image and pixel points in the mask image one by one.

In some embodiments, the fusing the mask image and the original image to obtain the target image corresponding to the pathologic change area includes: acquiring a first pixel value of each pixel point in the mask image and a second pixel value of each pixel point in the original image; fusing the first pixel value of each pixel point in the mask image and the second pixel value of a corresponding pixel point in the original image, to acquire a target pixel value of each pixel point; and forming the target image of the pathologic change area according to target pixel values of all pixel points.

In some embodiments, the fusing the first pixel value of each pixel point in the mask image and the second pixel value of the corresponding pixel point in the original image to acquire a target pixel value of each pixel point includes: dividing the first pixel value of each pixel point in the mask image by a maximum pixel value to obtain a ratio, and multiplying the ratio by the second pixel value of the corresponding pixel point in the original image, to obtain a first data; acquiring a difference value between the maximum pixel value and the first pixel value; adding the first data and the difference value to obtain the target pixel value of each pixel point.

In some embodiments, the acquiring the first pixel value of each pixel point in the mask image and the second pixel value of each pixel point in the original image includes: extracting the first pixel value of each pixel point in the mask image, and using the first pixel value of each pixel point to constitute a first matrix of the mask image, wherein a position of the first pixel value of each pixel point in the first matrix is determined by a position of the pixel point in the mask image; and extracting the second pixel value of each pixel point in the original image, and using the second pixel value of each pixel point to constitute a second matrix of the original image, wherein a position of the second pixel value of each pixel point in the second matrix is determined by a position of the pixel point in the original image the fusing the first pixel value of each pixel point in the mask image and the second pixel value of the corresponding pixel point in the original image to acquire a target pixel value of each pixel point includes: dividing the first matrix by the maximum pixel value, to obtain a third matrix; multiply a pixel value of each pixel point in the third matrix by the second pixel value of a corresponding pixel point in the second matrix, to obtain a fourth matrix; subtracting the first pixel value of each pixel point in the first matrix from the maximum pixel value respectively, to obtain a fifth matrix; and adding the fourth matrix and the fifth matrix, to obtain a sixth matrix, wherein a pixel value of each pixel point in the sixth matrix is the target pixel value of each pixel point.

In some embodiments, after the fusing the mask image and the original image to obtain the target image corresponding to the pathologic change area, the method further includes: diagnosing the pathologic change area in the target image to acquire a diagnosis result.

In some embodiments, before acquiring the first image, the method further includes: acquiring a sample image; acquiring mark data of the sample image, the mark data including position information of the pathologic change area in the sample image; and by the sample image and the mark data, training a neural network, to form the neural network which has a required function.

In some embodiments, before by the sample image and the mark data, training the neural network, to form the neural network which has a required function, the method further includes: randomly selecting a selected proportion of the sample images to be subjected to a hair supplement process; and/or, randomly selecting a selected proportion of the sample images to be subjected to a color enhancement process.

In some embodiments, the position information includes center coordinates and a radius value of the pathologic change area.

In some embodiments, the position information includes center coordinates, a major axis radius value and a minor axis radius value of the pathologic change area.

In some embodiments, the position information further includes center coordinates and a radius value of the sample image.

In some embodiments, before inputting the first image into the neural network to acquire the position information of the pathologic change area in the first image, the method further includes performing pretreatment on the first image.

In some embodiments, performing pretreatment on the first image includes: acquiring a size of the first image; comparing the size of the first image with an image resolution parameter of an input layer of the neural network to determine whether the size of the first image is more than the image resolution parameter of the input layer; in response to determining that the size of the first image is more than the image resolution parameter of the input layer, cutting or reducing the first image; and in response to determining that the size of the first image is less than the image resolution parameter of the input layer, enlarging the first image.

In some embodiments, the step of acquiring the boundary of the pathologic change area in the first image to acquire the original image and the mask image which include the pathologic change area from the first image is based on the position information and an image edge detection algorithm.

In some embodiments, acquiring the first image includes scanning the skin part of the patient to be diagnosed which needs diagnosis to form the first image.

In some embodiments, fusing the mask image and the original image includes performing a bitwise AND operation on the mask image and the original image.

According to some other embodiments of the present disclosure, there is provided an image processing device comprising: a first acquisition module configured to acquire a first image to be diagnosed, the first image including an image formed with respect to a skin part of a patient to be diagnosed which needs diagnosis; a machine learning module configured to input the first image into a neural network, to acquire position information of a pathologic change area in the first image; an extraction module configured to acquire a boundary of the pathologic change area in the first image, acquire an original image and a mask image which include the pathologic change area from the first image; a fuse module configured to fuse the mask image and the original image, obtain a target image corresponding to the pathologic change area; wherein the target image is an image for diagnosing the pathologic change area, pixel points in the target image correspond to those in the original image and the mask image one by one.

According to some other embodiments of the present disclosure, there is provided a computer device comprising: a processor; a memory; and computer program instructions stored in the memory, which, when executed by the processor, cause the processor to execute one or more steps of the image processing method provided by at least one embodiment of the present disclosure.

According to some other embodiments of the present disclosure, there is provided a non-transient computer-readable storage medium with computer programs stored thereon, which, when executed by a processor, cause the processor to execute one or more steps of the image processing method provided by at least one embodiment of the present disclosure.

Additional aspects and advantages of the present disclosure will be partially given in the following description, a part of them will become obvious from the following description, or be learned by practices of the present disclosure.

BRIEF DESCRIPTION OF THE DRAWINGS

The above and/or additional aspects and advantages of the present disclosure will become obvious and easily appreciated from the following description of embodiments in conjunction with the drawings, wherein.

DETAILED DESCRIPTION

Hereinafter, detail description of embodiments of the present disclosure is given, examples of the embodiments are shown in the drawings, wherein the same or similar reference numerals denote the same or similar elements or elements that have substantially the same or similar functions throughout. Embodiments described below with reference to the drawings are exemplary, are intended to explain the present disclosure, and can not be construed to limit the present invention.

In an embodiment of the present disclosure, a so-called neural network shows good application performance in many applications which process images, such as object recognition, object detection, object classification, etc. Since Constitutional Neural Networks (CNNs), e.g. CNNs which include multiple convolutional layers, may detect features of different regions and dimensions in an image through different convolutional layers, a deep learning method developed based on the CNN is used to perform classification and recognition on the image.

CNNs with various structures have been developed. A conventional CNN generally consists of an input layer, a convolutional layer, a pooling layer, a fully connected layer, i.e., INPUT (input layer) -CONV (convolutional layer) -POOL (pooling layer) -FC (fully connected layer). Wherein the convolutional layer performs feature extraction; the pooling layer performs dimension reduction on an input feature map; the fully connected layer is used to connect all the features, and perform output.

As described above, the applicant uses the CNN to describe a basic concept of an application of the neural network in a field of image processing, this is merely exemplary. In a field of machine learning, neural networks with various structures may be used in applications such as image processing, etc. Even the CNNs, in addition to the above listed conventional CNNs, may also be a Fully Convolutional Neural Network FCN, a Segmentation Network SegNet, Dilated Convolutions, an atrous-convolution-based deep neural network DeepLab (V1&V2), a multi-scale-convolution-based deep neural network DeepLab (V3), a multi-channel segmentation neural network RefineNet, etc.

Hereinafter, with reference to the drawings, image processing methods and devices of some embodiments of the present disclosure are described.

Figure 1:
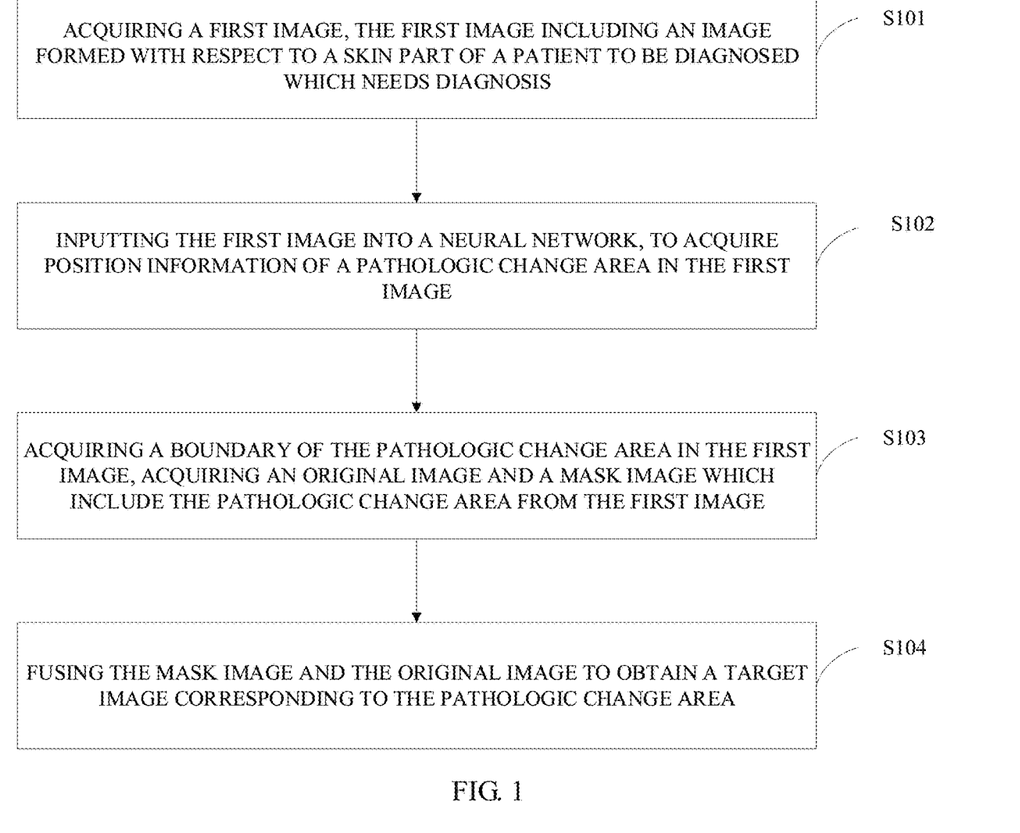
FIG. 1 is a flow diagram of an image processing method provided by some embodiments of the present disclosure.

FIG. 1 is a flow diagram of an image processing method provided by some embodiments of the present disclosure.

As shown in FIG. 1, the image processing method includes the following steps:

S101, acquiring a first image, the first image including an image formed with respect to a skin part of a patient to be diagnosed which needs diagnosis.

In an embodiment of the present disclosure, it is possible to form the image of the skin part by various skin imaging devices, the present disclosure does not limit it, each of a skin surface microscope, skin ultrasound, a laser confocal scanning microscope, etc, may be applied to the present disclosure.

For example, it is possible to put, the skin part of the patient to be diagnosed which needs diagnosis, in a photographing area of the skin surface microscope, photograph it by the skin surface microscope, obtain the first image for diagnosis.

Wherein, the adopted skin surface microscope may adopt a polarizing skin surface microscope or a non-polarizing skin surface microscope.

For example, a camera head on a mobile terminal such as a cellphone, a tablet, a camera, etc, is used to photograph the skin part which needs diagnosis, obtain the first image for diagnosis.

S102, inputting the first image into a neural network, to acquire position information of a pathologic change area in the first image.

In some embodiments, the method further includes a step of performing pretreatment on the first image. For example, a size of the first image, such as length and width of the image, is acquired, the size of the first image is compared with an image resolution parameter of an input layer of the adopted neural network. When the size of the first image is more than the image resolution parameter of the input layer, the first image is cut or reduced; when the size of the first image is less than the image resolution parameter of the input layer, the first image is enlarged.

For example, the image resolution parameter of the input layer (INPUT) of the adopted neural network is 32*32, the resolution of the first image is 600*600, the first image may be scaled to the resolution 32*32.

For example, the image resolution parameter of the input layer (INPUT) of the adopted neural network is 32*32, the resolution of the first image is 10*10, the first image may be stretched to the resolution 32*32.

The neural network processes the first image, outputs position information of the pathologic change area in the first image.

In some embodiments, the position information may include center coordinates, a radius value, etc, of the pathologic change area. Thereby, according to the center coordinates and the radius value, it is possible to obtain a circular area which includes the pathologic change area.

In some embodiments, the position information may include center coordinates, a major axis radius value, a minor axis radius value, etc, of the pathologic change area. Thereby, according to the center coordinates, the major axis radius value, the minor axis radius value, it is possible to obtain an elliptical area which includes the pathologic change area.

Those skilled in the art may understand that, other closed geometries may also be used to describe the position of the pathologic change area, e.g. they may be a rectangular region or other arbitrarily shaped areas which include the pathologic change area.

By the neural network, the circular area or the elliptical area, etc, which includes the pathologic change area, is acquired from the first image, this is advantageous to narrowing a range of positioning the pathologic change area. In addition, since medical experts who have rich experience of diagnosing pathological changes of the skin are limited, the neural network may improve the accuracy of the medical staff positioning the pathologic change area of the skin.

S103, acquiring a boundary of the pathologic change area in the first image, acquiring an original image and a mask image which include the pathologic change area from the first image.

In some embodiments, by an image edge detection algorithm, in conjunction with the position information, the original image and the mask image which include the pathologic change area are obtained.

For example, according to the center coordinates and the radius value in the position information, it is possible to obtain the circular area which includes the pathologic change area.

For example, according to the image edge detection algorithm, such as Snake algorithm, GAC (Generalized Arc Consistency) algorithm, Level Set algorithm, etc, the boundary of the pathologic change area is searched for from the circular area, and the original image and the mask image of the circular area which includes the pathologic change area are acquired from the first image.

Figure 2:
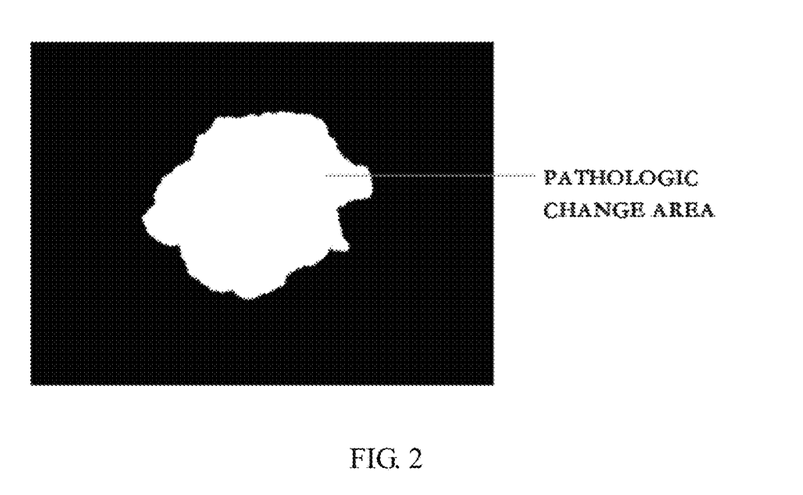
FIG. 2 is a mask image which includes a pathologic change area provided by some embodiments of the present disclosure.

For example, FIG. 2 is a mask image which includes the pathologic change area, wherein a white part in FIG. 2 is a mask image corresponding to the pathologic change area.

S104, fusing the mask image and the original image, obtaining a target image corresponding to the pathologic change area.

After acquiring the original image and the mask image which include the pathologic change area, a fusion process is performed on the mask image and the original image, to acquire the target image which includes only the pathologic change area. The fusion process includes, but not limited to, performing a bitwise AND operation on the mask image and the original image.

Figure 3:
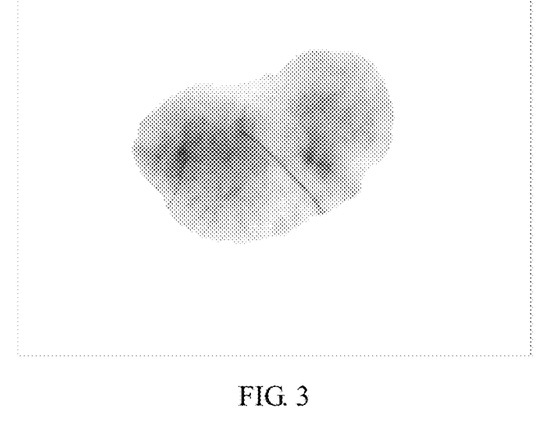
FIG. 3 is an image of one pathologic change area provided by some embodiments of the present disclosure.

Wherein, the target image includes only the image of the pathologic change area, does not include an image of a non-pathologic change area, the target image is an image for diagnosing the pathologic change area, pixel points in the target image correspond to those in the original image and the mask image one by one. For example, FIG. 3 is the target image of the pathologic change area obtained according to the mask image shown in FIG. 2.

Hereinafter, by one embodiment, how the target image of the pathologic change area is obtained through pixel values of pixel points in the mask image and pixel values of pixel points in the original image is introduced.

Figure 4:
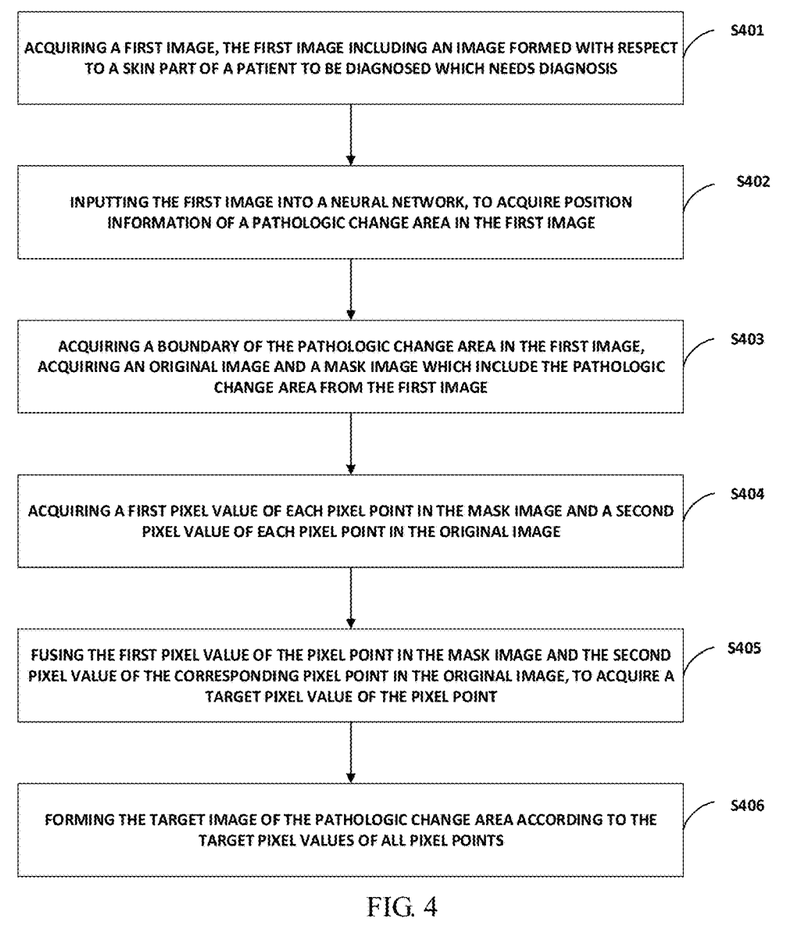
FIG. 4 is a flow diagram of another image processing method provided by some embodiments of the present disclosure.

As shown in FIG. 4, the image processing method includes the following steps:

S401, acquiring a first image, the first image including an image formed with respect to a skin part of a patient to be diagnosed which needs diagnosis.

S402, inputting the first image into a neural network, to acquire position information of a pathologic change area in the first image.

S403, acquiring a boundary of the pathologic change area in the first image, acquiring an original image and a mask image which include the pathologic change area from the first image.

Steps S401-S403 are similar to steps S101-S103 in the aforementioned embodiment, repeated description is no longer made herein.

S404, acquiring a first pixel value of each pixel point in the mask image and a second pixel value of each pixel point in the original image.

After acquiring the mask image and the original image, the first pixel value of each pixel point in the mask image and the second pixel value of each pixel point in the original image are respectively acquired.

In some embodiments, the numbers of the pixel points in the mask image and the original image are the same, and the pixel point positions correspond to each other.

S405, fusing the first pixel value of the pixel point in the mask image and the second pixel value of the corresponding pixel point in the original image, to acquire a target pixel value of the pixel point.

In some embodiments, with respect to each pixel point, the first pixel value is divided by a maximum pixel value to obtain a ratio, and the ratio is multiplied by the second pixel value of the corresponding pixel point in the original image, to obtain a first data. Then, the first pixel value is subtracted from the maximum pixel value to obtain a difference value. Finally, a value obtained by adding the first data and the difference value is the target pixel value of the pixel point. As shown in formula (1).

$$d_{pixel} = \frac{a_{mask}}{\max} * b_{org} + (\max - a_{mask}) \quad (1)$$

wherein, $d_{pixel}$ is the target pixel value of the pixel point, $a_{mask}$ is the first pixel value of the pixel point in the mask image, max is the maximum pixel value 255, $b_{org}$ is the second pixel value of the corresponding pixel point in the original image. Thus, $$\frac{a_{mask}}{\max} * b_{org}$$

is the first data, $\max - a_{mask}$ denotes the difference value between the maximum pixel value and the first pixel value.

S406, forming a target image of the pathologic change area according to the target pixel values of all pixel points.

After acquiring the target pixel value of each pixel point according to formula (1), the target pixel values of all pixel points are put in positions corresponding to the pixel points in the original image or the mask image, the target image which includes only the pathologic change area may be obtained.

In some embodiments, the pixel value of each pixel point in the mask image and the pixel value of a corresponding pixel point in the original image are fused, to obtain the target pixel value of the pixel point, so that it is possible to extract the image of the pathologic change area.

Figure 5:
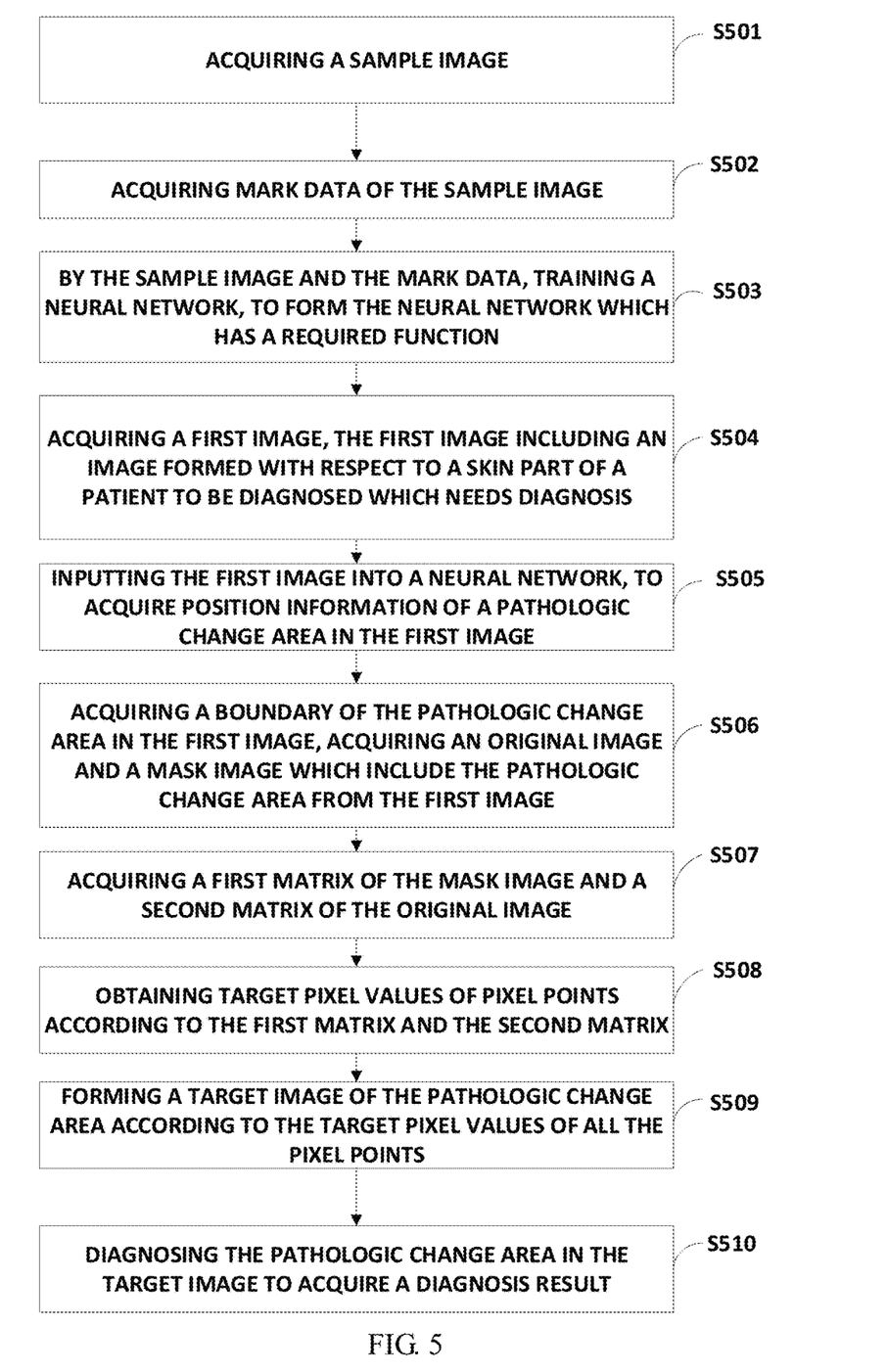
FIG. 5 is a flow diagram of still another image processing method provided by some embodiments of the present disclosure.

In some embodiments, it further includes, before scanning the skin part of the patient to be diagnosed which needs diagnosis to acquire the first image for diagnosis, training the neural network to cause it to have a required function of acquiring the position information of the pathologic change area in the first image. The training method of the neural network, as shown in FIG. 5, may include the following steps:

S501, acquiring a sample image.

In some embodiments, it is possible to acquire an image of a skin part of a patient diagnosed in the past from hospital, as the sample image.

S502, acquiring mark data of the sample image.

After acquiring the sample image, it is possible to mark position data of a pathologic change area in the sample image by a method of manually marking.

For example, taking a circular shape as an example, it is possible to mark center coordinates and a radius value of the pathologic change area in the sample image as well as center coordinates and a radius value of the sample image, thereby obtain the mark data of the sample image. Wherein, the mark data includes the center coordinates and the radius value of the pathologic change area in the sample image as well as the center coordinates and the radius value of the sample image.

Figure 6:
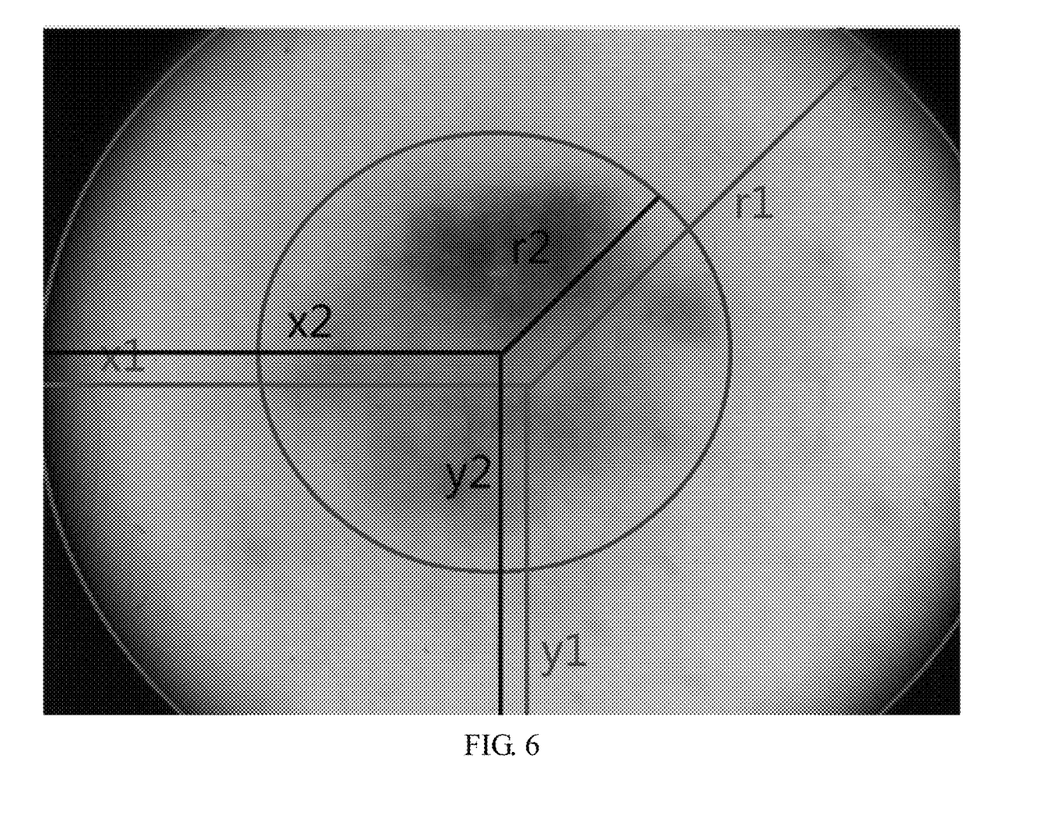
FIG. 6 is a schematic view of marks of a sample image provided by some embodiments of the present disclosure.

As shown in FIG. 6, by manually marking, center coordinates of a certain sample image is (x1,y1), a radius value is r1, center coordinates of a pathologic change area in the sample image are (x2,y2), a radius value is r2.

By the above mentioned step, it is possible to obtain multiple sample data sets for training a neural network, each sample in the data sets includes a sample image as well as marks corresponding to the sample image.

S503, by the sample image and the mark data, training a neural network, to form the neural network which has a required function.

The training process of the neural network is widely known in the art. By inputting the sample images and the mark data into the neural network with initial parameters, parameters of the neural network are continually optimized, to form the neural network which has a function of acquiring the position information of the pathologic change area in the first image. With respect to the formed neural network, the input of the input layer is an image, the output of the output layer is position information of a pathologic change area.

With respect to the neural network formed by training, the execution process is as described in the above embodiment. As shown below, a specific embodiment is shown.

S504, acquiring a first image, the first image including an image formed with respect to a skin part of a patient to be diagnosed which needs diagnosis.

S505, inputting the first image into a neural network, to acquire position information of a pathologic change area in the first image.

S506, acquiring a boundary of the pathologic change area in the first image, acquiring an original image and a mask image which include the pathologic change area from the first image.

Steps S504-S506 are similar to steps S101-S103 in the aforementioned embodiment, therefore repeated description is no longer made herein.

S507, acquiring a first matrix of the mask image and a second matrix of the original image.

In some embodiments, a first pixel value of each pixel point in the mask image is acquired, and the first pixel value of each pixel point is used, to constitute the first matrix of the mask image. Wherein, a position of the first pixel value of each pixel point in the first matrix is determined by a position of the pixel point in the mask image.

As an example, it is possible to use first pixel values of a first row of pixel points in the mask image as a first row of elements of the first matrix, use first pixel values of a second row of pixel points in the mask image as a second row of elements of the first matrix, that is, the number of rows and the number of columns of the pixel points in the mask image are the same as the number of rows and the number of columns of the first matrix.

As another example, it is possible to use first pixel values of a first row of pixel points in the mask image as a first column of elements of the first matrix, use first pixel values of a second row of pixel points in the mask image as a second column of elements of the first matrix. Therefore, the number of rows and the number of columns of the pixel points in the mask image correspond to the number of rows and the number of columns of the first matrix.

Likewise, a second pixel value of each pixel point in the original image is extracted, the second pixel value of each pixel point is used, to constitute the second matrix of the original image. Wherein, a position of the second pixel value of each pixel point in the second matrix is determined by a position of the pixel point in the original image.

S508, obtaining target pixel values of pixel points according to the first matrix and the second matrix.

In some embodiments, it is possible to divide the first matrix by a maximum pixel value, that is, divide each first pixel value in the first matrix by the maximum pixel value, to obtain a third matrix. Then, a pixel value of each pixel point in the third matrix is multiplied by a second pixel value of a corresponding pixel point in the second matrix, to obtain a fourth matrix. Then, the first pixel value of each pixel point in the first matrix is subtracted from the maximum pixel value respectively, to obtain a fifth matrix. Finally, the fourth matrix and the fifth matrix are added, to obtain a sixth matrix. Wherein, a pixel value of each pixel point in the sixth matrix is the target pixel value of the pixel point. As shown in formulas (2) and (3).

$$C = \frac{A_{mask}}{\max} \quad (2)$$

$$D_{pixel} = D + (MAX - A_{mask}) \quad (3)$$

wherein, C is the third matrix, $A_{mask}$ is the first matrix of the mask image, max is the maximum pixel value 255. D is the fourth matrix, is obtained by multiplying the pixel value of each pixel point in the third matrix C by the second pixel value of the corresponding pixel point in the second matrix $B_{org}$; a value of each element in a matrix MAX is the maximum pixel value, and the number of rows and the number of columns of the matrix are the same as the number of rows and the number of columns of the first matrix $A_{mask}$; the fifth matrix is obtained by MAX−$A_{mask}$; $D_{pixel}$ denotes the sixth matrix.

It is noted that, in the above mentioned embodiment, the number of rows and the number of columns of the fourth matrix are the same as the number of rows and the number of columns of the first matrix.

By the matrixes formed by the pixel values of the mask image and the original image, the target pixel values of the pixel points are computed, which improves a computation speed.

S509, forming a target image of the pathologic change area according to the target pixel values of all the pixel points.

After computing and obtaining the sixth matrix according to step S508, the target pixel value of each pixel point in the sixth matrix is put in a position corresponding to the pixel point in the original image or the mask image, the target image of the pathologic change area may be formed.

S510, diagnosing the pathologic change area in the target image to acquire a diagnosis result.

The diagnosis process of S510 may be performed by a doctor, and it is also possible to output the diagnosis result by Computer Aided Diagnosis software.

In some embodiments, it is possible to acquire an image of a pathologic change area which has already been diagnosed as a sample image, and based on a diagnosis result of the image, then use the sample image and its corresponding diagnosis result to construct a neural network for diagnosis, so that the neural network for diagnosis converges or an error is stabilized within an allowable error range. After obtaining a well trained neural network, it may be used to diagnose the patient.

Although, in the above description, the neural network is used to explain implementation of the computer aided diagnosis, other machine learning technologies may also be trained to form diagnosis models.

After obtaining the target image of the pathologic change area, the target image is input to a diagnosis model which is trained in advance, the diagnosis model diagnoses the pathologic change area in the target image, and outputs the diagnosis result.

In some embodiments, the image of the pathologic change area is input, as the image for diagnosis, to the diagnosis model for diagnosis, which improves the accuracy of the diagnosis result.

In some embodiments, in order to improve the robustness of the neural network for diagnosis, the method further includes a step of performing pretreatment on the sample image in training.

In some embodiments, a selected proportion of the sample images are randomly selected to be subjected to a hair supplement process. For example, it is possible to select one fourth of the sample images to be subjected to the hair supplement process. For example, it is possible to use an image processing method to simulate drawing of hair, and supplement that to skin areas in the sample images randomly according to a certain probability.

In some embodiments, a selected proportion of the sample images are randomly selected to be subjected to a color enhancement process. Wherein, the color enhancement includes aspects of the color such as saturation, brightness and contrast, etc.

By performing the hair supplement process or the color enhancement process or both on a preset proportion of the sample images to increase the diversity of the sample images, the accuracy of the output result of the trained neural network is improved.

In the image processing method provided by at least one embodiment of the present disclosure, position information of the pathologic change area in the photographed image is obtained through the neural network, and the boundary of the pathologic change area is determined (in some embodiments, e.g., based on the obtained position information and the image edge detection algorithm), the original image and the mask image which include the pathologic change area are obtained, the original image and the mask image are fused, i.e., it is possible to obtain the image which includes only the pathologic change area from the original image.

In the image processing method provided by at least one embodiment of the present disclosure, the first image for diagnosis is formed by scanning the skin part of the patient to be diagnosed which needs diagnosis, the first image is input to the neural network to acquire position information of the pathologic change area in the first image, and e.g., according to the position information and the image edge detection algorithm, the boundary of the pathologic change area is determined, the original image and the mask image which include the pathologic change area are acquired from the first image, the mask image and the original image are fused, to obtain the target image corresponding to the pathologic change area, wherein the target image is an image for diagnosing the pathologic change area, pixel points in the target image correspond to those in the original image and the mask image one by one. By separating the pathologic change area from the non-pathologic change area in the original image, the image which includes only the pathologic change area is obtained, so that it is possible to position the pathologic change area accurately in the skin image, and extract the image of the pathologic change area.

Some embodiments of the present disclosure also proposes an image processing device.

Figure 7:
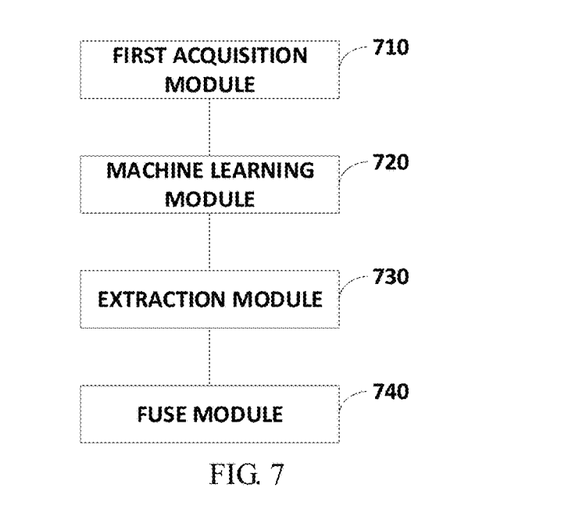
FIG. 7 is a structural diagram of an image processing device provided by some embodiments of the present disclosure.

As shown in FIG. 7, the image processing device includes: a first acquisition module 710, a machine learning module 720, an extraction module 730, a fuse module 740.

The first acquisition module 710 is used to acquire a first image to be diagnosed, the first image including an image formed with respect to a skin part of a patient to be diagnosed which needs diagnosis;

In some embodiments, the first acquisition module is integrated with a skin imaging device, scans the skin part of the patient to be diagnosed which needs diagnosis, forms the first image for diagnosis.

In some embodiments, the skin imaging device scans the skin part of the patient to be diagnosed which needs diagnosis, forms the first image for diagnosis, the first acquisition module is coupled to the skin imaging device to acquire the formed first image.

The machine learning module 720 is used to input the first image into a neural network, to acquire position information of a pathologic change area in the first image.

The extraction module 730 is used to acquire a boundary of the pathologic change area in the first image, acquire an original image and a mask image which include the pathologic change area from the first image.

The fuse module 740 is used to fuse the mask image and the original image, obtain a target image corresponding to the pathologic change area, wherein the target image is an image for diagnosing the pathologic change area, pixel points in the target image correspond to those in the original image and the mask image one by one.

Figure 8:
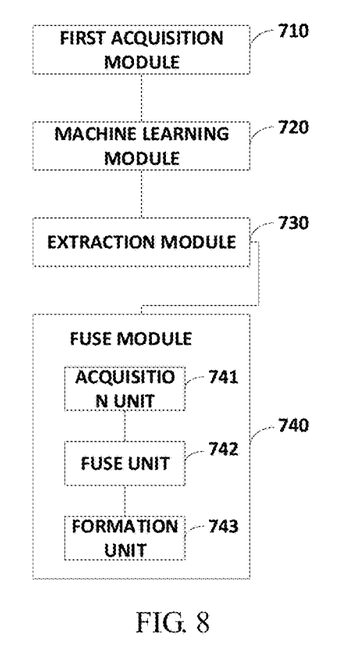
FIG. 8 is a structural diagram of another image processing device provided by some embodiments of the present disclosure.

In some embodiments, as shown in FIG. 8, the fuse module 740 includes: an acquisition unit 741, a fuse unit 742, a formation unit 743.

The acquisition unit 741 is used to acquire a first pixel value of each pixel point in the mask image and a second pixel value of each pixel point in the original image.

The fuse unit 742 is used to fuse the first pixel value of the pixel point in the mask image and the second pixel value of the corresponding pixel point in the original image, to acquire a target pixel value of the pixel point.

The formation unit 743 is used to form a target image of the pathologic change area according to the target pixel values of all pixel points.

In some embodiments, the fuse unit 742 is also used to:
with respect to each pixel point, divide the first pixel value by a maximum pixel value to obtain a ratio, and multiply the ratio by the second pixel value, to obtain a first data;
acquire a difference value between the maximum pixel value and the first pixel value;
add the first data and the difference value to obtain the target pixel value of the pixel point.

In some embodiments, the acquisition unit 741 is also used to:
extract a first pixel value of each pixel point in the mask image, and use the first pixel value of each pixel point to constitute a first matrix of the mask image; wherein a position of the first pixel value of each pixel point in the first matrix is determined by a position of the pixel point in the mask image;
extract a second pixel value of each pixel point in the original image, and use the second pixel value of each pixel point to constitute a second matrix of the original image;
wherein a position of the second pixel value of each pixel point in the second matrix is determined by a position of the pixel point in the original image;

the fuse unit 742 is also used to:
divide the first matrix by the maximum pixel value, to obtain a third matrix;
multiply a pixel value of each pixel point in the third matrix by the second pixel value of a corresponding pixel point in the second matrix, to obtain a fourth matrix;
subtract the first pixel value of each pixel point in the first matrix from the maximum pixel value respectively, to obtain a fifth matrix;
add the fourth matrix and the fifth matrix, to obtain a sixth matrix, wherein a pixel value of each pixel point in the sixth matrix is the target pixel value of the pixel point.

In some embodiments, the image processing device further includes:
a diagnosis module for inputting the target image to a diagnosis model for learning, diagnosing the pathologic change area in the target image to acquire a diagnosis result.

In some embodiments, the image processing device further includes:
a second acquisition module for acquiring an image of a patient diagnosed in the past as a sample image for training a constructed initial neural network;
a third acquisition module for acquiring mark data of the sample image, the mark data including a position of a pathologic change area in the sample image;
a training module for inputting the sample images and the mark data into the neural network for training, to form the neural network which has a function of acquiring position information of the pathologic change area in the first image.

In some embodiments, the image processing device further includes:
a pretreatment module for randomly selecting a preset proportion of the sample images to be subjected to a hair supplement process; and/or,
randomly selecting a preset proportion of the sample images to be subjected to a color enhancement process.

It is to be noted that, the aforementioned explanation of the embodiments of the image processing method is also applicable to the image processing device of the present embodiment, repeated description is no longer made herein.

In the image processing device provided by at least one embodiment of the present disclosure, the first image for diagnosis is formed by scanning the skin part of the patient to be diagnosed which needs diagnosis, the first image is input to the neural network for learning to acquire position information of the pathologic change area in the first image, the original image and the mask image which include the pathologic change area are acquired from the first image, the mask image and the original image are fused, to obtain the target image corresponding to the pathologic change area, wherein the target image is an image for diagnosing the pathologic change area, pixel points in the target image correspond to those in the original image and the mask image one by one. By fusing the original image and the mask image, it is possible to separate the pathologic change area from the non-pathologic change area in the original image, obtain the image which includes only the pathologic change area, so that it is possible to position and extract the pathologic change area accurately in the photographed image, reduce the labor cost.

Some embodiments of the present disclosure also proposes a computer device comprising: a processor; a memory; and computer program instructions stored in the memory, which, when executed by the processor, cause the processor to execute one or more steps of the image processing method provided by at least one embodiment of the present disclosure.

Some embodiments of the present disclosure also proposes a non-transient computer-readable storage medium with computer program instructions stored thereon, which, when executed by a processor, cause the processor to execute one or more steps of the image processing method provided by at least one embodiment of the present disclosure.

Hereinafter, with reference to FIG. 9, a specific implementation structure suitable to implement a computer device 800 of an embodiment of the present disclosure is illustrated. The computer device shown in FIG. 9 is merely an example, and does not limit a function and a use range of an embodiment of the present disclosure in any way.

Figure 9:
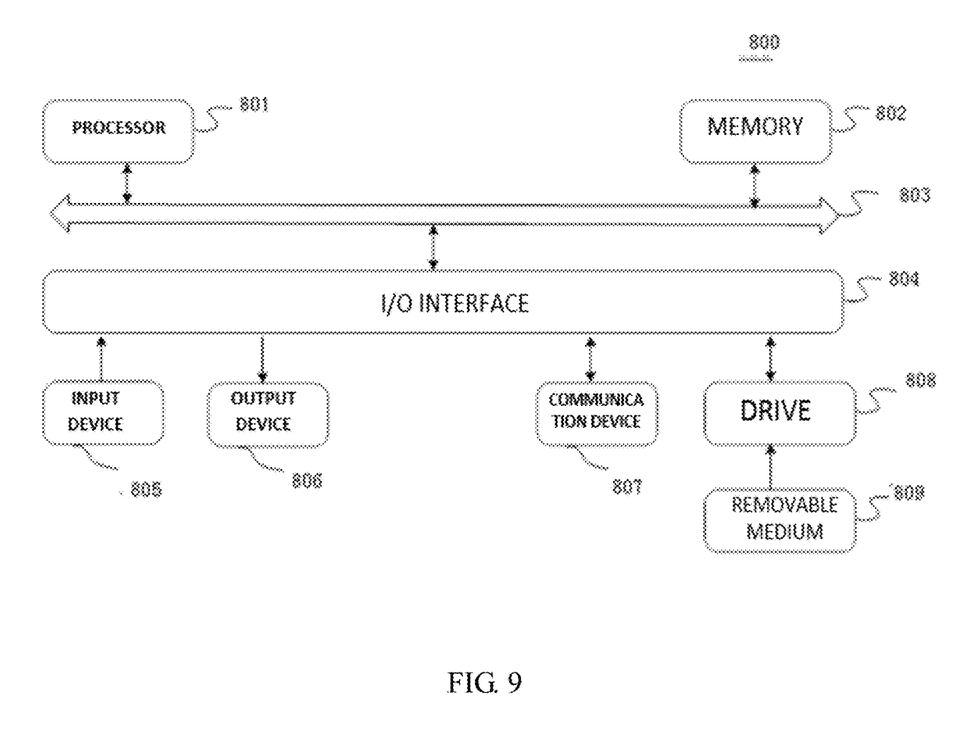
FIG. 9 is a structural diagram of a computer device provided by some embodiments of the present disclosure.

As shown in FIG. 9, the computer system 800 includes one or more processors 801, which may execute various operations according to program instructions stored in a memory 802 (e.g., program instructions are stored in the memory 802 such as a read-only memory or a magnetic disk, etc, and are loaded into a random access memory (RAM)). In the memory 802, various programs and data required for operations of the computer system 800 are also stored. The processor 801, the memory 802 are connected with each other through a bus 803. An input/output (I/O) interface 804 is also connected to the bus 803.

Various components may be connected to the I/O interface 804 to achieve output and output of information. E.g. an input device 805 which includes a keyboard, a mouse, etc; an output device 806 which includes such as a Cathode Ray Tube (CRT), a Liquid Crystal Display (LCD), etc, as well as a speaker, etc; a communication device 807 which includes a network interface card such as a LAN card, a modem, etc. The communication device 807 executes a communication process by way of a network such as Internet. A drive 808 is also connected to the I/O interface 803 according to needs. A removable medium 809, such as a magnetic disk, an optical disk, a Flash memory, etc, is connected to or installed in the drive 808 according to needs.

Wherein, the processor 801 may be a logic operation device which has a data process capability and/or a program execution capability, such as a central processor (CPU) or a field programmable gate array (FPGA) or a single-chip microcomputer (MCU) or a digital signal processor (DSP) or an application specific integrated circuit (ASIC), etc.

Wherein, the bus 803 may be Front Side Bus (FSB), QuickPath Interconnect (QPI), direct media interface (DMI), Peripheral Component Interconnect (PCI), Peripheral Component Interconnect Express (PCI-E), HyperTransport (HT), etc.

According to an embodiment of the present disclosure, the above processes described with reference to flow charts may be implemented as computer software programs. For example, an embodiment of the present disclosure includes a computer program product, the computer program product includes a computer program carried on a computer-readable medium, the computer program includes program codes for executing the image processing method of at least one embodiment of the present disclosure. In such an embodiment, the computer program may be downloaded and installed through the communication device 807 from a network, and/or installed from the removable medium 809. When the computer program is executed by the processor 801, it executes the above mentioned functions defined in the system of the present disclosure.

In the description of the specification, the description with reference to terms "one embodiment", "some embodiments", "an example", "a specific example", or "some examples", etc, means that specific features, structures, materials or characteristics described in conjunction with the embodiment or the example are included in at least one embodiment or example of the present disclosure. In the specification, exemplary expressions of the above mentioned terms do not necessarily refer to the same embodiments or examples. Moreover, the described specific features, structures, materials or characteristics may be combined in a suitable way in any one or more embodiments or examples. In addition, in a case where there is no mutual contradiction, those skilled in the art may integrate and combine different embodiments or examples as well as features of different embodiments or examples described in the specification.

In addition, Terms "first", "second" are only for the purpose of description, can not be understood to indicate or imply relative importance or implicitly indicate the number of indicated technical features. Thus, features defined with "first", "second" may explicitly or implicitly include at least one of the features. In the description of the present disclosure, "multiple" refers to at least two, e.g. two, three, etc, unless specifically limited otherwise.

Any process or method description described in a flow chart or herein in other ways may be understood to denote a module, segment or portion of code, which includes one or more executable instructions of steps for achieving customized logic functions or processes, and a range of preferable embodiments of the present disclosure includes additional implementations, wherein functions may be executed not in the illustrated or discussed order, including substantially concurrently or in the reverse order depending upon the functionality involved, this should be understood by those skilled in the art to which embodiments of the present disclosure belong.

Logic and/or steps shown in a flow chart or described herein in other ways, for example, may be considered to be a sequencing list of executable instructions for implementing logical functions, may be specifically embodied in any computer-readable medium, for use by, or in connection with, an instruction execution system, device, or device (e.g., a system based on a computer, a system including a processor or a system which fetches instructions from the instruction execution system, device, or apparatus and executes the instructions). In the specification, a "computer-readable medium" may be any device that can contain, store, communicate, propagate, or transport the program for use by or in connection with the instruction execution system, device, or apparatus. More specific examples (a non-exhaustive list) of the computer readable medium would include the following: an electrical connection having one or more wires (an electronic device), a portable computer diskette (a magnetic device), a random access memory (RAM), a read-only memory (ROM), an erasable programmable read-only memory (EPROM or a Flash memory), an optical fiber device, and a portable compact disc read-only memory (CD-ROM). In addition, the computer-readable medium may even be paper or another suitable medium upon which the program may be printed, as the program can be electronically captured, via, for instance, optical scanning of the paper or other medium, then compiled, interpreted, or otherwise processed in a suitable manner, if necessary, and then stored in a computer memory.

It should be understood that, respective parts of the present disclosure may be embodied as hardware, software, firmware or a combination thereof. In the above mentioned embodiments, multiple steps or methods may be embodied as software or firmware which is stored in the memory and executed by a suitable instruction execution system. For example, if they are embodied as hardware in another embodiment, any of the following technologies well-known in the art or a combination thereof may be used: a discrete logic circuit which has a logic gate circuit for achieving a logical function with respect to data signals, an application specific integrated circuit which has suitable combined logic gate circuits, a programmable gate array (PGA), a field programmable gate array (FPGA), etc.

Those ordinary skilled in the art may understood that, all or a part of, steps carried in the above mentioned embodiment method may be executed by a program instructing relevant hardware, the program may be stored in a computer-readable storage medium, and when the program is executed, it includes one of steps of the method embodiment or a combination thereof.

In addition, respective functional units in respective embodiments of the present disclosure may be integrated in one processing module, respective units may also exist independent physically, two or more than two of the above units may also be integrated in one module. The above mentioned integrated module may be embodied as hardware, may also be embodied as a software function module. When the integrated module is embodied as a software function module and is sold or used as an independent product, it may also be stored in one computer-readable storage medium.

The above mentioned storage medium may be a read-only memory, a magnetic disk or an optical disk, etc. While embodiments of the present disclosure have been illustrated and described above, it may be understood that, the above mentioned embodiments are exemplary, can not be understood to limit the present disclosure, those ordinary skilled in the art may make changes, alterations, substitutions and modifications to the above mentioned embodiments within the scope of the present disclosure.

What is claimed is:

1. An image processing method comprising:
    acquiring a first image, the first image including an image formed with respect to a skin part of a patient to be diagnosed which needs diagnosis;
    inputting the first image into a neural network, to acquire position information of a pathologic change area in the first image;
    acquiring a boundary of the pathologic change area in the first image, acquiring an original image and a mask image which include the pathologic change area from the first image; and
    fusing the mask image and the original image to obtain a target image corresponding to the pathologic change area; wherein the target image is an image for diagnosing the pathologic change area, and wherein pixel points in the target image have a one-to-one correspondence to pixel points in the original image and to pixel points in the mask image,
    wherein fusing the mask image and the original image to obtain the target image corresponding to the pathologic change area includes:
    acquiring a first pixel value of each pixel point in the mask image and a second pixel value of each pixel point in the original image;
    fusing the first pixel value of each pixel point in the mask image and the second pixel value of a corresponding pixel point in the original image, to acquire a target pixel value of each pixel point; and
    forming the target image of the pathologic change area according to target pixel values of all pixel points.

2. The image processing method according to claim 1, wherein fusing the first pixel value of each pixel point in the mask image and the second pixel value of the corresponding pixel point in the original image to acquire a target pixel value of each pixel point includes:
    dividing the first pixel value of each pixel point in the mask image by a maximum pixel value to obtain a ratio, and multiplying the ratio by the second pixel value of the corresponding pixel point in the original image, to obtain a first data;
    acquiring a difference value between the maximum pixel value and the first pixel value; and
    adding the first data and the difference value to obtain the target pixel value of each pixel point.

3. The image processing method according to claim 1, wherein acquiring the first pixel value of each pixel point in the mask image and the second pixel value of each pixel point in the original image includes:
    extracting the first pixel value of each pixel point in the mask image, and using the first pixel value of each pixel point to constitute a first matrix of the mask image, wherein a position of the first pixel value of each pixel point in the first matrix is determined by a position of the pixel point in the mask image, and
    extracting the second pixel value of each pixel point in the original image, and using the second pixel value of each pixel point to constitute a second matrix of the original image, wherein a position of the second pixel value of each pixel point in the second matrix is determined by a position of the pixel point in the original image;
    wherein fusing the first pixel value of each pixel point in the mask image and the second pixel value of the corresponding pixel point in the original image to acquire the target pixel value of each pixel point includes:
    dividing the first matrix by the maximum pixel value, to obtain a third matrix,
    multiplying a pixel value of each pixel point in the third matrix by the second pixel value of a corresponding pixel point in the second matrix, to obtain a fourth matrix,
    subtracting the first pixel value of each pixel point in the first matrix from the maximum pixel value respectively, to obtain a fifth matrix, and
    adding the fourth matrix and the fifth matrix, to obtain a sixth matrix, wherein a pixel value of each pixel point in the sixth matrix is the target pixel value of each pixel point.

4. The image processing method according to claim 1, wherein after fusing the mask image and the original image to obtain the target image corresponding to the pathologic change area, the method further includes:
    diagnosing the pathologic change area in the target image to acquire a diagnosis result.

5. The image processing method according to claim 1, wherein before acquiring the first image, the method further includes:
    acquiring a sample image;
    acquiring mark data of the sample image, the mark data including position information of the pathologic change area in the sample image; and training a neural network, by the sample image and the mark data, to form the neural network which has a required function.

6. The image processing method according to claim 5, wherein before training the neural network, by the sample image and the mark data, to form the neural network which has a required function, the method further includes at least one of:
randomly selecting a selected proportion of the sample image to be subjected to a hair supplement process; or,
randomly selecting a selected proportion of the sample image to be subjected to a color enhancement process.

7. The image processing method according to claim 1, wherein the position information includes center coordinates and a radius value of the pathologic change area.

8. The image processing method according to claim 1, wherein the position information includes center coordinates, a major axis radius value and a minor axis radius value of the pathologic change area.

9. The image processing method according to claim 1, before inputting the first image into the neural network to acquire the position information of the pathologic change area in the first image, the method further includes performing pretreatment on the first image.

10. The image processing method according to claim 9, wherein performing pretreatment on the first image includes:
acquiring a size of the first image;
comparing the size of the first image with an image resolution parameter of an input layer of the neural network to determine whether the size of the first image is more than the image resolution parameter of the input layer;
in response to determining that the size of the first image is more than the image resolution parameter of the input layer, cutting or reducing the first image; and
in response to determining that the size of the first image is less than the image resolution parameter of the input layer, enlarging the first image.

11. The image processing method according to claim 1, wherein acquiring the boundary of the pathologic change area in the first image to acquire the original image and the mask image which include the pathologic change area from the first image is based on the position information and an image edge detection algorithm.

12. The image processing method according to claim 1, wherein acquiring the first image includes scanning the skin part of the patient to be diagnosed which needs diagnosis to form the first image.

13. The image processing method according to claim 1, wherein fusing the mask image and the original image includes performing a bitwise AND operation on the mask image and the original image.

14. A computer device comprising: a processor; a memory;
and computer program instructions stored in the memory, which, when executed by the processor, cause the processor to execute the image processing method according to claim 1.

15. The computer device of claim 14, wherein the fusing the mask image and the original image to obtain the target image corresponding to the pathologic change area includes:
acquiring a first pixel value of each pixel point in the mask image and a second pixel value of each pixel point in the original image;
fusing the first pixel value of each pixel point in the mask image and the second pixel value of a corresponding pixel point in the original image, to acquire a target pixel value of each pixel point; and
forming the target image of the pathologic change area according to target pixel values of all pixel points.

16. The computer device of claim 14, wherein the fusing the first pixel value of each pixel point in the mask image and the second pixel value of the corresponding pixel point in the original image to acquire a target pixel value of each pixel point includes:
dividing the first pixel value of each pixel point in the mask image by a maximum pixel value to obtain a ratio, and multiplying the ratio by the second pixel value of the corresponding pixel point in the original image, to obtain a first data;
acquiring a difference value between the maximum pixel value and the first pixel value; and
adding the first data and the difference value to obtain the target pixel value of each pixel point.

17. The computer device of claim 14, wherein acquiring the first pixel value of each pixel point in the mask image and the second pixel value of each pixel point in the original image includes:
extracting the first pixel value of each pixel point in the mask image, and using the first pixel value of each pixel point to constitute a first matrix of the mask image, wherein a position of the first pixel value of each pixel point in the first matrix is determined by a position of the pixel point in the mask image, and
extracting the second pixel value of each pixel point in the original image, and using the second pixel value of each pixel point to constitute a second matrix of the original image, wherein a position of the second pixel value of each pixel point in the second matrix is determined by a position of the pixel point in the original image;
wherein fusing the first pixel value of each pixel point in the mask image and the second pixel value of the corresponding pixel point in the original image to acquire the target pixel value of each pixel point includes:
dividing the first matrix by the maximum pixel value, to obtain a third matrix,
multiplying a pixel value of each pixel point in the third matrix by the second pixel value of a corresponding pixel point in the second matrix, to obtain a fourth matrix,
subtracting the first pixel value of each pixel point in the first matrix from the maximum pixel value respectively, to obtain a fifth matrix, and
adding the fourth matrix and the fifth matrix, to obtain a sixth matrix, wherein a pixel value of each pixel point in the sixth matrix is the target pixel value of each pixel point.

18. The computer device of claim 14, wherein after fusing the mask image and the original image to obtain the target image corresponding to the pathologic change area, the method further includes:
diagnosing the pathologic change area in the target image to acquire a diagnosis result.

19. A non-transient computer-readable storage medium with computer program instructions stored thereon, which, when executed by a processor, cause the processor to execute the image processing method according to claim 1.

* * * * *

UNITED STATES PATENT AND TRADEMARK OFFICE
CERTIFICATE OF CORRECTION

PATENT NO. : 11,170,482 B2
APPLICATION NO. : 16/619771
DATED : November 9, 2021
INVENTOR(S) : Lvwei Wang et al.

Page 1 of 2

It is certified that error appears in the above-identified patent and that said Letters Patent is hereby corrected as shown below:

On the Title Page

Column 1, Item (73) Assignee, Line 2, after "LTD." insert -- (CN) --

Page 2, Column 1, Item (57) Abstract, Line 3, delete "19 Claims," and insert -- 18 Claims, --

In the Claims

Column 17, Lines 59-66 through Column 18, Lines 1-65, DELETE "15. The computer device of claim 14, wherein the fusing the mask image and the original image to obtain the target image corresponding to the pathologic change area includes: acquiring a first pixel value of each pixel point in the mask image and a second pixel value of each pixel point in the original image; fusing the first pixel value of each pixel point in the mask image and the second pixel value of a corresponding pixel point in the original image, to acquire a target pixel value of each pixel point; and forming the target image of the pathologic change area according to target pixel values of all pixel points." and INSERT:
-- 15. The computer device of claim 14, wherein the fusing the first pixel value of each pixel point in the mask image and the second pixel value of the corresponding pixel point in the original image to acquire a target pixel value of each pixel point includes:
dividing the first pixel value of each pixel point in the mask image by a maximum pixel value to obtain a ratio, and multiplying the ratio by the second pixel value of the corresponding pixel point in the original image, to obtain a first data;
acquiring a difference value between the maximum pixel value and the first pixel value; and
adding the first data and the difference value to obtain the target pixel value of each pixel point.
16. The computer device of claim 14, wherein acquiring the first pixel value of each pixel point in the mask image and the second pixel value of each pixel point in the original image includes:
extracting the first pixel value of each pixel point in the mask image, and using the first pixel value of each pixel point to constitute a first matrix of the mask image, wherein a position of the first pixel value of each pixel point in the first matrix is determined by a position of the pixel point in the mask image, and Signed and Sealed this
Twenty-second Day of November, 2022

Katherine Kelly Vidal
*Director of the United States Patent and Trademark Office* extracting the second pixel value of each pixel point in the original image, and using the second pixel value of each pixel point to constitute a second matrix of the original image, wherein a position of the second pixel value of each pixel point in the second matrix is determined by a position of the pixel point in the original image;

wherein fusing the first pixel value of each pixel point in the mask image and the second pixel value of the corresponding pixel point in the original image to acquire the target pixel value of each pixel point includes:

dividing the first matrix by the maximum pixel value, to obtain a third matrix, multiplying a pixel value of each pixel point in the third matrix by the second pixel value of a corresponding pixel point in the second matrix, to obtain a fourth matrix, subtracting the first pixel value of each pixel point in the first matrix from the maximum pixel value respectively, to obtain a fifth matrix, and adding the fourth matrix and the fifth matrix, to obtain a sixth matrix, wherein a pixel value of each pixel point in the sixth matrix is the target pixel value of each pixel point.

17. The computer device of claim 14, wherein after fusing the mask image and the original image to obtain the target image corresponding to the pathologic change area, the method further includes: diagnosing the pathologic change area in the target image to acquire a diagnosis result.

18. A non-transient computer-readable storage medium with computer program instructions stored thereon, which, when executed by a processor, cause the processor to execute the image processing method according to claim 1. --